United States Patent Office 3,558,326
Patented Jan. 26, 1971

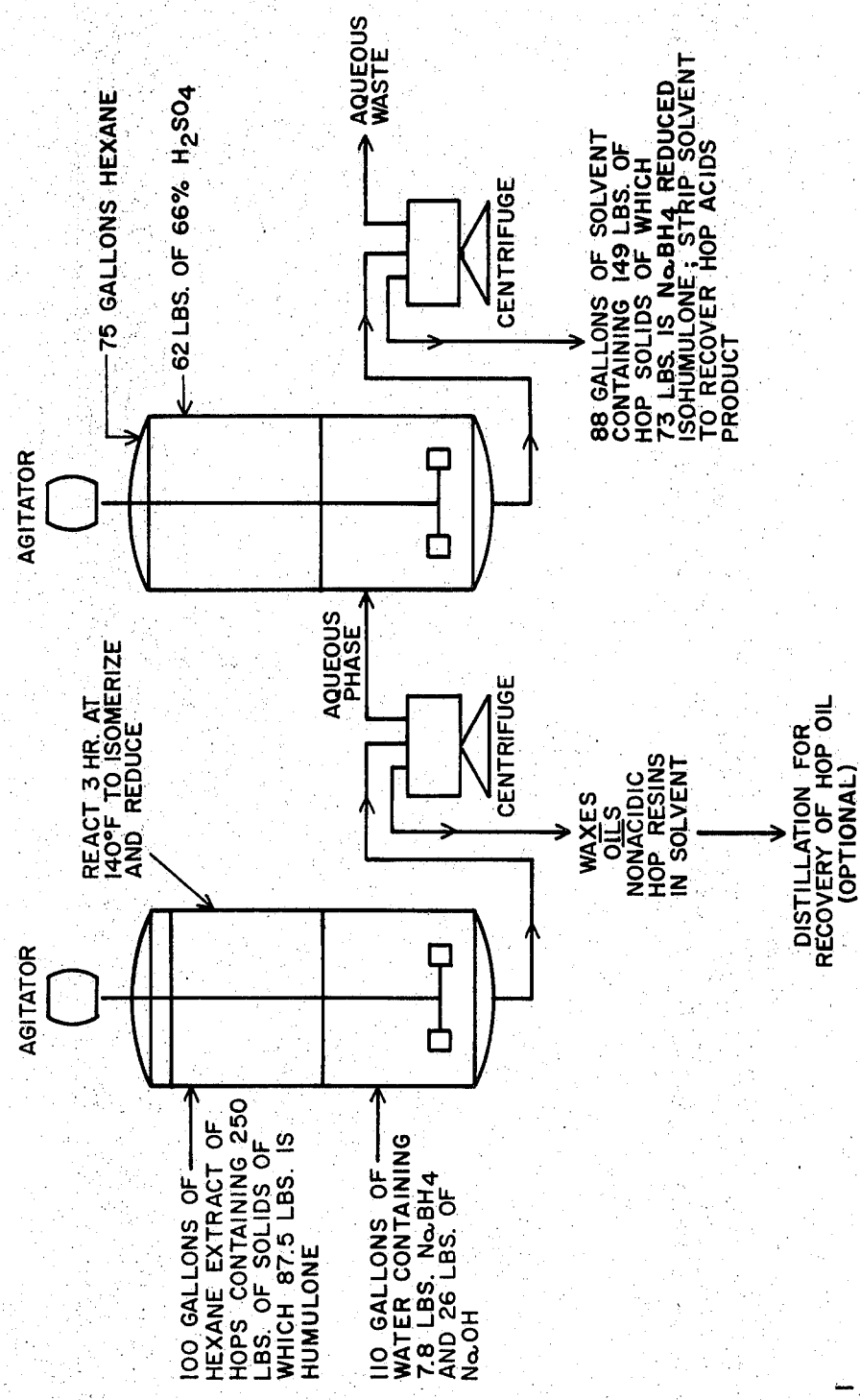

3,558,326
PROCESS FOR ISOMERIZING AND PURIFYING HOP EXTRACTS
Donald H. Westermann, Brookfield, and William C. Herwig and William J. Durant, Milwaukee, Wis., assignors to Miller Brewing Company, Milwaukee, Wis., a corporation of Wisconsin
Filed Sept. 21, 1967, Ser. No. 669,467
Int. Cl. C12c 9/02
U.S. Cl. 99—50.5        2 Claims

ABSTRACT OF THE DISCLOSURE

A hop extract substantially free from waxes, oils, and nonacidic hop components is prepared by treating a water-immiscible solvent solution of hop extract with an aqueous alkaline solution to isomerize acid hop components in the aqueous phase. The waxes, oils, and nonacidic hop components enter the nonaqueous phase and are removed with the latter. The aqueous phase is acidified, more solvent is added, and the hop acids enter the solvent phase and are recovered therefrom. The extract is used in making beer of improved light stability.

---

The brewing industry has reflected increased attention toward the problem of the utilization of hops in the brewing process. This is occasioned by the desire to modify hop extracts for the purpose of promoting light stability with respect to the mercaptan formation on exposure of regular beer to light and for the purpose of increasing the economic utilization of bittering agents derived from hops.

It is known that the waxes are substantially insoluble in alcohols and the hop oils have partial solubility. This property is used as a technique to eliminate waxes and oils from commercial extracts. The water-immiscible solvent extract, after removal of water-immiscible solvent, is redissolved in alcohol leaving the wax and some oils as an insoluble residue, as cited in Example 1 of U.S. Pat. No. 3,044,879. This method is tedious and adds unnecessary cost to the process; it eliminates none of the nonacidic resins and not all of the oils and waxes. It is the object of this invention to show how these components can be economically eliminated to form an extract giving improved light-stability in the finished beer.

It is a further object of the invention to show a simple, economical process for the isomerization and reduction of humulone to reduced isohumulone in a two phase aqueous and water-immiscible system giving excellent high yield of reduced isohumulone.

The relationship of the pH of a system, the ionization constant (pKa), and salt concentration is defined by the Henderson-Hasselbalch equation which states:

$$pH = pK'a + \log \frac{(salt)}{(acid)}$$

wherein pK'a is substantially the same as pKa. At the half ionization value where (salt)=(acid) the pH=pK'a. The hop acids have the following pKa:

Humulone _____ 5.5
Isohumulone _____ 3.8
Lupulone _____ 5.8

When excess alkali is added to an aqueous solution in the presence of a water-immiscible solution of hop acids, the ionization is increased enhancing the solubility of the hop acid in the aqueous system. Conversely, the addition of excess acid to an aqueous system in the presence of a water-immiscible solvent in which the acids are soluble markedly depresses the solubility in the aqueous phase forcing the acids into the water-immiscible solvent. These facts are known and are used in conventional hop analysis techniques. However, prior to this invention it was not known how to apply these principles successfully in an economic commercial operation.

The drawing shows a flow sheet setting forth a preferred embodiment of the invention.

The following example in which sodium borohydride reduced isohumulone as a bittering agent is produced in accordance with U.S. Pat. No. 3,044,879 will serve to illustrate the method for isomerizing humulone in a two phase liquid system with the subsequent production of an extract substantially free of hop waxes, oils, and nonacidic components.

EXAMPLE

A hexane extract of hops was concentrated to prepare 250 pounds of solids as a 40% solution of hop solids in hexane. To this solution was added 110 gallons of water containing 65 pounds of a 12% sodium borohydride solution in 40% caustic. The result was a two phase aqueous-hexane system. The pH of the aqueous phase was 12, which value was substantially above the pKa of hop acids resulted in the extraction of the hop acids from the hexane solution into the aqueous phase. The hop acids were isomerized and reduced by the sodium borohydride in accordance with U.S. Pat. No. 3,044,879 for a period of 3 hours at 140° F. under constant agitation. The dispersed two phase system was run through a conventional centrifuge (Westphalia model 5ADOH–5036) separating the alkaline aqueous phase containing acidic components from the hexane phase which contained hop waxes, oils, and nonacidic resins.

The aqueous phase was charged to another vessel into which 75 gallons of clean hexane and 62 pounds of commercial 66% sulfuric acid was added. The pH of the aqueous phase after the acid addition was 1.5 which is substantially acid with respect to the pKa of hop acids. The acidic condition of the aqueous phase suppressed the ionization of the hop acids making them insoluble in the aqueous phase but soluble in the hexane phase. The two phase system was centrifuged through the same centrifuge resulting in recovery of 88 gallons of hexane phase, containing 149 pounds of hop solids which analyzed 49% reduced isohumulone, and 125 gallons aqueous phase. The hexane phase, when evaporated to dryness, contained a preisomerized hop extract free of waxes, oils, and nonacidic resins suitable for emulsifying or solution in an organic solvent for subsequent post kettle addition.

It is apparent to those skilled in the art that it is not necessary to add sodium borohydride for the subsequent reduction of isohumulone which has been produced during the time which the hop extract is exposed to the aqueous system under alkaline conditions. Elimination of the sodium borohydride accompanied by shorter isomerization time produces conventional isohumulone in a whole hop extract which is also amenable to the subsequent separations for the production of a preisomerized extract free of waxes, oils, and nonacidic resins. Reduction with borohydride is however greatly preferred, since this embodiment of the invention gives an extract providing greater light stability in the beer, as will be discussed below.

Hop oils from the first centrifugation following isomerization and reduction can, if desired, be recovered by conventional distillation producing a stream which contains hexane and hop oil, followed by further distillation of the hexane from the hop oil or steam distillation of the hexane from the top oil leaving a pure residual of hop oil which can be added to the brewing process to produce the desired hop aroma.

The resultant mixture of reduced isohumulones and lupulones, now freed of oils, waxes, and nonacidic components, is used in brewing in the conventional manner. When added to the brew kettle in a quantity equivalent to 40 or more p.p.m. of reduced isohumulone, dependent upon bitterness desired in the finished product, the beer thus obtained shows substantial increase in light stability as compared to beer processed identically except that the oils, waxes, and nonacidic resins were not removed from the reduced isomerized hop extract.

To determine light stability the beer was tested in standard 12-ounce clear flint bottles placed between, and 2 inches distant from, two side light sources. Each light source contained two 40-watt fluorescent lamps, viz., one daylight, e.g., General Electric Corp. 40–D Daylight, and one black light, available commercially from General Electric Corp., designated as BLD Blacklight. The accelerated test conditions were designed to expose the beer, within minutes, to approximately the same amount of light received in normal handling over a matter of weeks or months.

The test panel was made up of at least six qualified beer tasters. Each member of the panel tasted the beer and assigned a number from 0 to 5. A rating of zero indicated no light struck character, and a rating of 5 indicated an extreme light struck character. The ratings were collected and averaged, and the averages reported in the Table following.

TABLE

Ratings for Light-Exposed Beer (See Note below)

| Time, minutes | 0 | 5 | 10 | 15 | 30 | 60 |
|---|---|---|---|---|---|---|
| Beer: | | | | | | |
| A | 0.2 | 1.4 | | 1.6 | | |
| B | 0.0 | 1.6 | | 2.6 | | |
| C | 0.0 | | | 1.5 | | |
| D | 0.1 | 2.4 | | 2.9 | | |
| E | 0.0 | 2.0 | | 2.3 | | |
| F | 0.2 | 1.8 | | 3.6 | | |
| G | 0.0 | 0.3 | | 0.9 | 1.5 | |
| H | 0.0 | 0.0 | 0.0 | 0.0 | 1.8 | 2.3 |

Note.—Beers A–F were made with borohydride-reduced hop extract containing waxes, oils, and nonacidic resins. Beers G and H were made using borohydride-reduced hop extract treated as in the example above. Dashes in the table indicate that data were not available. All beers were standard commercial grades.

Although we do not wish to be bound to any theory as to why removal of oils, waxes, and nonacidic resins gives improved light stability, the results of our experiments are consistent with the following explanation. The isohumulone molecule contains a methyl pentenoyl side chain, $(CH_3)_2 C=CHCH_2C:O—$, attached to the number 4 carbon of the ring. This side chain is reactive, and reacts with —SH groups in the beer, in the presence of light, to split from the ring and form highly odoriferous mercaptans. This mechanism can be inhibited by inactivating the side chain, as by reduction of the carbonyl group with sodium borohydride, thereby forming the corresponding alcohol. This reduction eliminates the formation of the characteristic mercaptans, notably 3-methyl-2-butene-1-thiol, associated with light struck beer and attributed to isohumulones. This is the reason that borohydride-reduced isohumulones are stable to light. However, we have found that a whole hop extract, after borohydride reduction and isomerization (although greatly superior to hop extract that has been merely isomerized) still develops light instability on extended exposure to light energy. Our research indicates that one or more of the (probably non-volatile) components of the oils, waxes, and/or nonacidic resins in the whole hop extract appear to generate small amounts of humulones, or other compounds with side chains similar to isohumulones, quite possibly from polymeric precursors of these molecules. On processing after reduction and/or standing, these precursors apparently depolymerize to give small additional amounts of isohumulones or similar compounds, which, under these conditions, would not be reduced, and therefore would possess methyl pentenoyl side chains susceptible to scission and mercaptan formation. By removing these precursors in the oils, waxes, and nonacidic resins, this potential source of mercaptan contamination is substantially completely precluded.

We claim:

1. A method for the production of a hop extract substantially free of waxes, oils, and nonacidic hop components comprising the steps of:

(a) adding to a water-immiscible solvent solution of hop extract containing waxes, oils, nonacidic hop components, and hop acids including humulone, an aqueous system substantially alkaline with respect to the pKa of both humulone and eupulone acidic hop components, thereby to provide a two phase liquid system consisting of an alkaline aqueous phase containing in solution said humulone and eupulone acidic hop components and a water-immiscible solvent phase, containing said waxes, oils, and nonacidic hop components;

(b) heating the two phase liquid system to isomerize the humulone to isohumulone;

(c) separating the water-immiscible solvent containing said waxes, oils, and nonacidic hop components from the alkaline aqueous system containing said acidic hop components;

(d) adding fresh water-immiscible solvent to the alkaline aqueous system containing hop acids;

(e) acidifying the aqueous phase containing said acid hop components to a pH substantially acid with respect to the pKa of said hop acids, thereby to cause the said hop acids to enter the water-immiscible solvent phase;

(f) separating the water-immiscible solvent phase now containing said hop acids from the acidic aqueous phase;

(g) and recovering said hop acids from the water-immiscible solvent.

2. A method according to claim 1 in which the isohumulones produced in the aqueous phase substantially alkaline with respect to the pKa of hop acids are reduced with sodium borohydride during the isomerization step.

References Cited

UNITED STATES PATENTS

| 3,044,879 | 7/1962 | Koch et al. | 99—50.5 |
| 3,298,835 | 1/1967 | Hildebrand et al. | 99—50.5 |
| 3,364,265 | 1/1968 | Klingel et al. | 99—50.5X |

JOSEPH M. GOLIAN, Primary Examiner